United States Patent
Tinker et al.

(10) Patent No.: US 6,456,329 B1
(45) Date of Patent: Sep. 24, 2002

(54) DE-INTERLACING OF VIDEO SIGNALS

(75) Inventors: Michael Tinker; Glenn Arthur Reitmeier, both of Yardley, PA (US)

(73) Assignee: Sarnoff Corporation, Princeton, NJ (US)

(*) Notice: Subject to any disclaimer, the term of this patent is extended or adjusted under 35 U.S.C. 154(b) by 0 days.

(21) Appl. No.: 09/491,709

(22) Filed: Jan. 26, 2000

Related U.S. Application Data
(60) Provisional application No. 60/129,934, filed on Apr. 19, 1999.

(51) Int. Cl.[7] .............................................. H04N 11/20
(52) U.S. Cl. ....................................... 348/448; 348/581
(58) Field of Search ................................. 348/448, 452, 348/459, 581

(56) References Cited

U.S. PATENT DOCUMENTS

| | | | |
|---|---|---|---|
| 4,603,350 A | * 7/1986 | Arbeider et al. ............ | 348/448 |
| 5,134,480 A | 7/1992 | Wang et al. | |
| 5,305,104 A | 4/1994 | Jensen et al. | |
| 5,473,382 A | 12/1995 | Nohmi et al. | |
| 5,838,385 A | * 11/1998 | Reder et al. ................. | 348/448 |
| 6,166,773 A | * 12/2000 | Greggain et al. ............ | 348/448 |

OTHER PUBLICATIONS

S. A. Booth, "Digital TV in the U.S.", IEEE Spectrum, Mar. 1999, pp. 40–46.

A., Patti, "Digital Video Filtering for Standards Conversion and Resolution Enhancement", (Ph.D. Thesis) abstract, Dec. 1995, 1 page.

"Microsoft Deinterlacing",from http://www.microsoft.com/DDK/DDKdocs/win98ddk/dd–ddk 8h87.htm, date unknown, 2 pages.

E.B.Bellers and G. De Hann "Advanced Motion Estimation and Motion Compensated Deinterlacing", International Workshop on HDTV '96 (paper No. H96–07), Abstract, Oct. 8–9, 1996, 1 page.

\* cited by examiner

*Primary Examiner*—Victor R. Kostak
(74) *Attorney, Agent, or Firm*—William J. Burke

(57) ABSTRACT

De-interlacing of interlaced image fields to obtain non-interlaced image frames includes removing the blank lines of each image field and removing one-half of the pixels of the remaining lines of each image field, thereby to obtain image frames having one-half the number of lines (i.e about one-half the vertical resolution) and one-half the number of pixels in each horizontal line (i.e. about one-half the horizontal resolution). Removing the blank lines may include interpolating pixel values for lines in the positions of the blank lines from the pixel values of adjacent lines, retaining the interpolated lines, and removing the adjacent lines, thereby to substantially reduce vertical jitter that would be caused by the one-half line positional difference between adjacent image fields. The invention has the advantage of greatly simplifying the implementation of such de-interlacing arrangement.

28 Claims, 3 Drawing Sheets

DE-INTERLACING OF VIDEO SIGNALS

This Application claims the benefit of U.S. Provisional Application Ser. No. 60/129,934 filed Apr. 19, 1999.

The present invention relates to de-interlacing of video signals.

A motion picture, whether produced from film or electronic video information comprises a sequence of frames of picture information projected sequentially, i.e. a display of a sequence of still images progressing at a controlled rate. Images are displayed at a sufficiently high rate so that the viewer doesn't perceive the flicker of the individual frame images, e.g., 60 frames per second.

Where technology, bandwidth or other limitation does not allow information to be transmitted at full rate, methods transmitting information at a lower rate that will not unacceptably degrade the picture are used. Historically, television signals have been encoded in a interlaced format to increase viewer perception of the information of the picture. For example, television signals transmitted in the NTSC format include 60 interlaced fields per second, with each successive two fields making up a complete frame of picture information, typically in a 4:3 horizontal to vertical aspect ratio. An interlaced format means that each frame of picture information is separated into two fields of picture information, with each field including half of the lines of picture information in the frame, as in the simplified illustrations of two successive interlaced fields in FIG. 1. In NTSC format, for example, each frame is captured in 480 horizontal lines, with 240 lines transmitted in each field, i.e. the even numbered lines are transmitted in one field and the odd numbered lines are transmitted in the next successive field, and so forth. For purposes of illustration, fewer lines are shown in FIG. 1.

Many newer video standards, including the ATSC standard for digital video, utilize interlaced pictures because of the advantage it offers in display quality. On the other hand, modem display devices such as computer monitors and certain high-definition televisions employ a progressive scan wherein images are displayed as a sequence of frames without interlacing of lines or fields. I.e. each frame contains all the horizontal lines of a picture. Thus, a progressive display displays 480 horizontal lines per frame at a rate of 60 frames per second, twice as many as an equivalent interlaced display.

To display video received in an interlaced image encoding format on a progressive scan display requires conversion of interlaced video signals into progressive video signals, i.e. creating a series of progressive images from interlaced images. Problems associated with such conversion at full image resolution (i.e. without loss of picture detail) are that the resulting progressive image requires twice as much information as is contained in the interlaced image, and that massive memories needed to store fields of video information (field memories) and frames of video information (frame memories). Also, converting video data from one format to the other is very computationally intensive and various interpolations and other combinations of video data must be undertaken, typically millions of times per field.

Apparatus performing such full resolution conversions is very complex and expensive. An additional problem arises due to movement in the image between fields which when processed by the conversion computations often produces objectionable artifacts, i.e. objects appearing in two places or smeared or disturbing patterns. Conventional solutions tend to increase the complexity of the conversion process, and so increase the cost thereof in attempting to overcome these problems.

Even where so-called "simplified" de-interlacing schemes have been proposed, as in the example of the "bob" de-interlacing technique proposed by a major software company, the process remains computationally intensive. In the "bob" technique, the blank lines in each field are dropped, but then are in effect sought to be restored by a "times-two zoom" process to fill in the "missing" lines in an attempt to regain the vertical resolution and aspect ratio lost due to the dropping of one half the lines. This requires a computationally intensive process in which each pixel in the "missing" line is calculated from the pixel values of the two lines adjacent thereto. In addition, the full pixel content of each horizontal line is retained, thereby requiring at least a full field memory including memory storage for the full pixel content of each horizontal line, or a full frame memory if high-speed real-time interpolation computation is not provided.

Accordingly, there is a need for a simplified method for converting interlaced image fields into non-interlaced image frames. It is desirable that such method provide the advantage of simplified computation, even if the resolution of the resulting image frames is reduced.

To this end, the method of converting a sequence of interlaced image fields into a sequence of non-interlaced image frames of the present invention comprises:

removing each blank line of each image field, thereby to retain each line of each image field alternating with the blank lines therein, each such retained line including a sequence of image pixels; and removing one-half the image pixels of the sequence of image pixels of each retained line of each image field.

In accordance with another aspect of the present invention, a storage medium encoded with machine-readable computer instructions for converting a sequence of interlaced image fields into a sequence of non-interlaced image frames comprises:

means for causing a computer to remove each blank line of each image field, thereby to retain each line of each image field alternating with the blank lines therein, each such retained line including a sequence of image pixels; and means for causing the computer to remove one-half the image pixels of the sequence of image pixels of each retained line of each image field.

BRIEF DESCRIPTION OF THE DRAWING

The detailed description of the preferred embodiments of the present invention will be more easily and better understood when read in conjunction with the FIGURES of the Drawing which include.

DESCRIPTION OF THE PREFERRED EMBODIMENT

Figure 1:
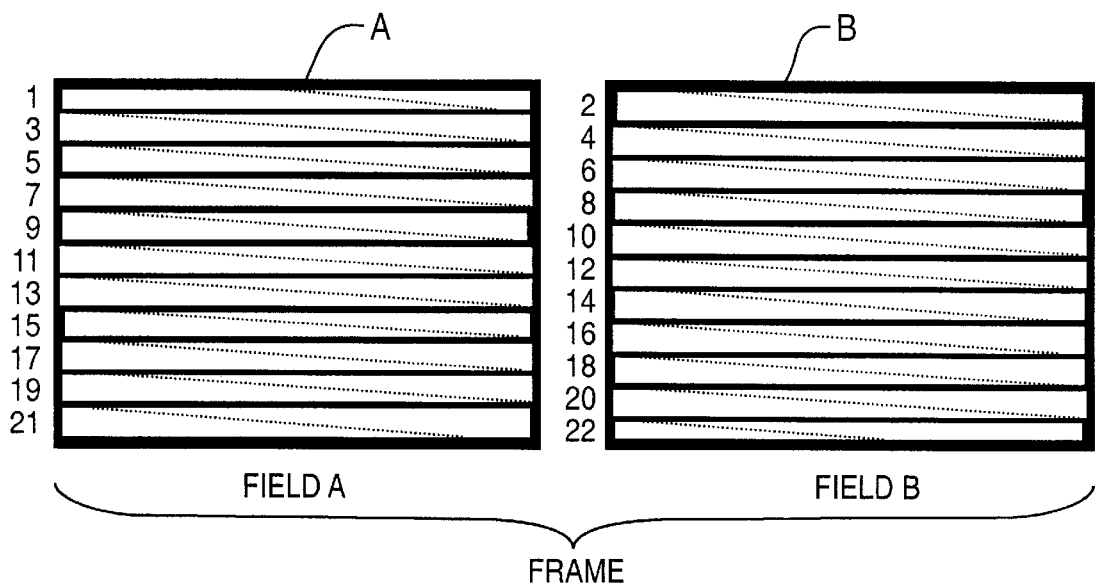
FIG. 1 is a diagram illustrating two successive interlaced image fields.
Figure 2:
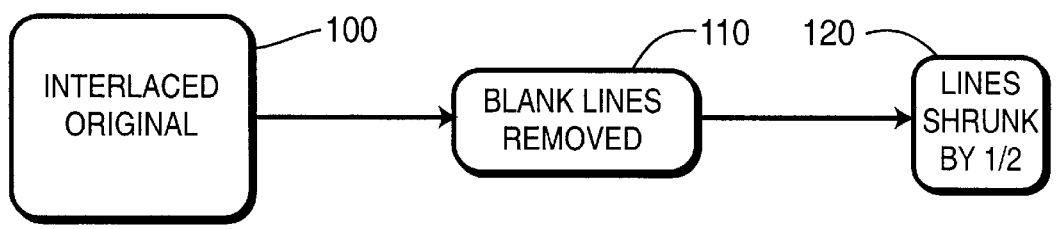
FIG. 2 is a schematic block diagram of a de-interlacing arrangement according to the present invention.

FIG. 2 is a schematic block diagram of a de-interlacing arrangement according to the present invention, which desirably embodies simplified computational processes and which desirably avoids the need for full field-store memories or full frame-store memories. The process begins with an interlaced original image signal 100 including a sequence of image fields identified as alternating interlaced image field A and interlaced image field B that together comprise an image frame. Interlaced image field A includes the odd-numbered lines of an image and interlaced image field B includes the even-numbered lines of the image, for example, as illustrated in FIG. 1. A complete image is provided by the sequence of alternating image fields A-B-A-B-A-B . . . , for example. Because only every other line of each of interlaced image fields A and B actually contain picture or image information, i.e. pixels having a value, the lines therebetween contain no image information, i.e. no pixel values, and are referred to as blank lines. The blank lines (i.e. the even-numbered lines of field A and the odd-numbered lines of field B) are removed or dropped 110 leaving only those lines containing pixel information. The remaining lines, which contain the full number of pixels for a complete line at full resolution, are shrunk 120 by one half. Where the lines comprise analog video pixels, "shrinking" the lines may be provided by sampling the analog signal at regular intervals of time at a sampling rate of one-half the rate at which the analog signal would normally be sampled. Where the lines comprise digital video pixels, i.e. are a sequence of digital words representing pixel values, one half the digital words may be removed or dropped. Preferably, every other analog sample or digital word, i.e. alternating pixels, is retained.

For example, a standard-definition NTSC interlaced image formed of two 240 line by 720 pixel interlaced fields at a rate of 60 fields per second produces a 480 line by 720 pixel interlaced image frame at a rate of 30 frames per second. In a full conventional conversion to non-interlaced or progressive scan, the standard-definition NTSC interlaced fields would be converted to 480 line by 720 pixel progressively scanned frames at a rate of 60 frames per second. In the foregoing conversion according to the present invention, the standard-definition NTSC interlaced fields are converted to 240 line by 360 pixel frames at a rate of 60 frames per second, i.e. a higher frame rate than the standard NTSC image, but at reduced resolution.

As used herein, image and/or information are used interchangeably with respect to what is displayed on a display device, whether in interlaced or non-interlaced form as an image field or frame, and are intended to encompass any and all of the wide variety of displays that a user may desire, including, but not limited to, visual images and pictures, whether still or moving, whether generated by a camera, computer or any other source, whether true, representative or abstract or arbitrary, whether or not including symbols or characters such as alphanumeric characters or mathematical notations, whether displayed in black and white, monochrome, polychrome or full color.

In general, to properly reduce the image in each of the vertical and horizontal directions without producing undesirable aliasing that results in objectionable artifacts in the image, it is necessary to perform lowpass filtering of the image both vertically and horizontally to remove the high frequency content of the signal that produces such aliasing. However, for much of the video produced today, an image of acceptable quality may be obtained without such filtering. Artifacts may form in an unfiltered image where there are high temporal and spatial frequencies present, for example, when very fast moving sharp edges occur. In images with relatively low frequencies present, e.g., images of slow-moving or stationary objects, aliasing will be minimal.

The foregoing method provides satisfactory conversion of a sequence of interlaced image fields into a sequence of non-interlaced or progressively scanned image frames having about one-half the vertical and one-half the horizontal resolution of the original interlaced image or an equivalent progressively scanned image. The resulting sequence of non-interlaced image frames is suitable for certain applications, whether in a television or television-type display or a computer monitor or display or the like, such as insertion of a smaller image into a display of a much larger image, sometimes referred to as "pix-in-pix," as is done on certain televisions or for images in a page of text in a computer display, or in a small screen display, such as might be found on the view finder of an inexpensive video camcorder, it may not be suitable in other applications where a vertical jitter might be apparent to a viewer. The reason for this may be understood by considering FIG. 3 which is a diagram illustrating the relative spatial positions of sequences of lines of portions of two successive interlaced image fields A and B.

Figure 3:
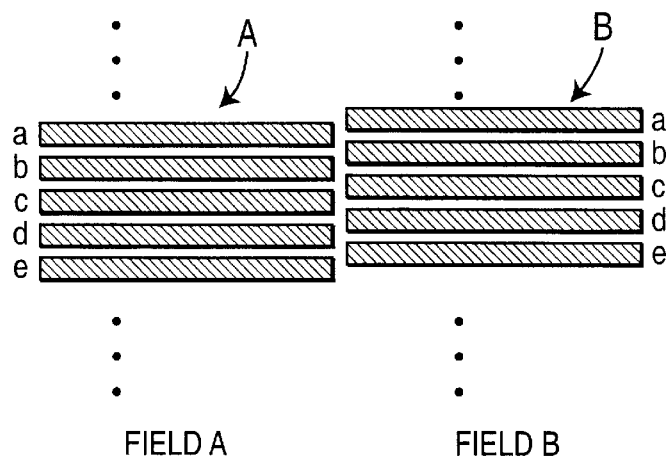
FIG. 3 is a diagram illustrating the relative spatial positions of sequences of lines of portions of two successive image fields.

In FIG. 3, field A containing only the odd-numbered lines contains lines a, b, c, d, e that contain pixel information and are slightly offset in the vertical direction from the corresponding even-numbered lines a, b, c, d, e of field B that contain pixel information. When displayed as an interlaced image, the lines of field A fill in the blanks in field B and the lines of field B fill in the blanks in field A to complete an image frame. When collapsed by the removal 110 of blank lines and displayed as an image frame, the lines of fields A and B are in effect offset or misaligned by one-half a line, and so the frame image will move up and down from frame to frame by the dimension of one-half a line at the frame rate, e.g., 60 times per second. If the display is large enough for this vertical movement to be perceived by a viewer, it might be considered objectionable and so is desirably removed.

Figure 4:
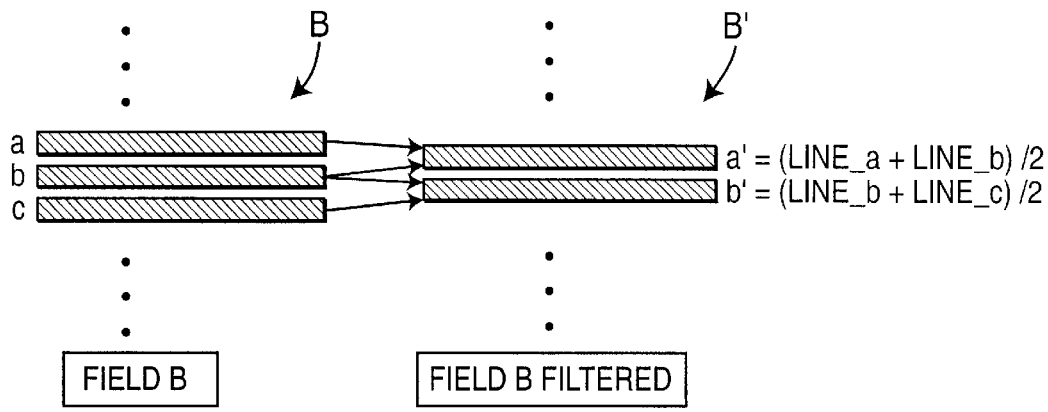
FIG. 4 is a diagram illustrating the relative spatial positions of a sequence of lines of a portion of an image field and a transformation thereof.

FIG. 4 is a diagram illustrating the relative spatial positions of a sequence of pixel-containing lines of a portion of one image field and a transformation thereof to remove the about one-half line spatial offset or misalignment that produces the aforementioned vertical jitter. A suitable transformation (or filtering) is one that interpolates, such as by simple averaging, the pixels of two adjacent lines of one of the two NTSC interlaced fields and substitutes the averaged line therefor. Where the transformation operates on the lines of field B, for example, as in FIG. 4, an interpolation by averaging is performed by adding the values of adjacent lines a and b of field B and dividing the sum by two, the result being the averaged line a' of transformed or filtered field B'. Similarly, lines b and c of field B are likewise averaged to produce the averaged line b' of transformed field B'.

Preferably, the values of pixels at corresponding horizontal positions along each of the lines are transformed to produce a pixel value for the pixel at that particular position in the transformed line. Also preferably, the transformation of pixel values is performed after the number of pixels along the horizontal lines has been reduced, thereby reducing the number of pixel values to be transformed. For analog picture information, the pixel values of the adjacent lines may be averaged by a summing network, such as a resistor network, that provides at its output the sum of the input signals attenuated by two, although the attenuation need not be two or any specific value so long as the contributions from the pixel values of each adjacent line are evenly weighted. For digital picture information, the pixel values of the digital words representing pixels at the corresponding horizontal position of the adjacent lines are digitally added and are then divided by two. Also preferably, the removing of blank lines precedes the reduction of the number of pixels in each line.

Thus, the values of corresponding pixels of adjacent lines containing pixel information, i.e. alternate lines of alternate interlaced fields, are transformed, such as by interpolation, e.g., by averaging, to produce a new line containing pixel information that is shifted vertically by about one-half the vertical line spacing from that of the untransformed field. When frames containing the transformed lines derived from alternate ones of the interlaced fields are displayed alternately with untransformed frames derived from the other ones of the interlaced fields, each frame is properly aligned, both horizontally and vertically, with the preceding frame and the following frame. With properly aligned lines, video images can be displayed as non-interlaced (i.e. progressively scanned) image frames at the field rate of the original interlaced video signal (e.g., 60 per second), but with one-half the resolution, horizontally and vertically.

Particular advantage obtains from the present invention due to the substantially reduced number of operations to be performed in converting the interlaced image fields into non-interlaced image frames, the performing of these operations on a reduced number of pixels, and also due to the great simplicity of the operations required. Prior art de-interlacing schemes cannot provide these advantages because they retain all the pixels horizontally and interpolate vertically to fill in all the blank lines of every interlaced field with interpolated lines to produced "zoomed" or full-resolution non-interlaced frames, for example, the resulting image "must be zoomed two times (2×) in the vertical direction using an interpolated overlay approach" in the prior art "bob" method.

These advantages of the present invention make it particularly suitable for implementation utilizing a single-instruction, multiple data (SIMD) computer architecture, such as may be found as part of the architecture of a conventional microprocessor. SIMD processors (computers), like other parallel processors, are configured to perform simultaneous parallel operations on plural digital data. Thus, transformation of plural pixel values in de-interlacing interlaced video image information, as described herein for the filtering or transformation of the values of pixels in adjacent lines of alternate interlaced image fields is performed on plural pixels simultaneously.

For example, a processor that performs parallel operations on eight bytes of digital information simultaneously, can transform (e.g., average) two lines each containing 720 pixels into a single line containing 360 pixels in only 90 operation cycles, where the reduction 120 of the number of pixels by two occurs prior to the transformation operation. In the transformation operation, the processor operates on eight pixels in parallel during each processor operation cycle, so that allowing two cycles (e.g., one for an ADD operation and one for a SHIFT operation) for each set of pixels, results in 90 operation cycles being required per line. To perform this transformation on 240 lines of 30 alternate fields per second requires only 240×30×90=648,000 operations per second, which is a very small number of operations for a processor operating at several hundred million operation cycles per second, and so the present invention advantageously lends itself to be performed as background processing in a processor engaged in other operations, such as, for example, a microprocessor in a computer or in a digital television receiver. It is noted that four cycles may be required to process each transformation in a pipeline architecture, e.g., operations for FETCH, ADD, SHIFT and STORE, which would delay the time at which the transformed data is available to four cycles, but would not increase the number of calculation cycles.

Figure 5:
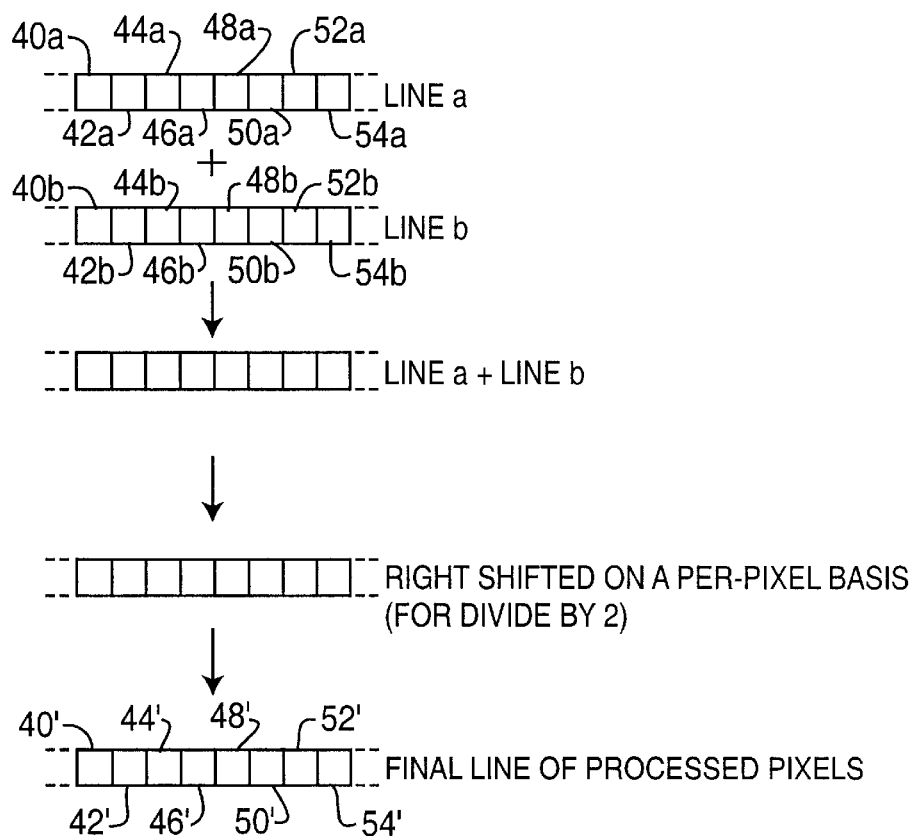
FIG. 5 is a diagram illustrating a representation of a transformation process related to the transformation of an image field of FIG. 4

FIG. 5 is a diagram illustrating a representation of a process operation transforming two adjacent pixel-containing lines of an interlaced image field, such as the image field B' of FIG. 4. In the portions of the lines containing pixel information shown in FIG. 5, each square represents a pixel value after the reduction 120 of the number of pixels horizontally, so that only the pixels in alternate positions, e.g., the even-numbered pixels, remain. Thus, lines a and b each contain only even-numbered pixels 40*a*, 42*a*, 44*a* . . . , 54*a* and 40*b*, 42*b*, 44*b* . . . , 54*b*, respectively. In particular, eight pixels are illustrated as are processed in parallel by an eight-byte parallel processor.

The pixel values of eight pixels of each of lines a and b are added together to produce the eight sums thereof, which when the pixel values of lines a and b are 8-bit digital words, produces eight 9-bit sums due to the need for an overflow bit position. The eight sums are then each divided by two, in a manner appropriate to the particular form of binary coding utilized, e.g., pure (8-4-2-1) or modified binary, twos complement, binary coded decimal, Gray code, and so forth. Dividing by two may be as simple as shifting the bits of each sum one bit to the right, for example, where the values are represented in a pure binary (i.e. 8-4-2-1) bit weighting. Note that a one-bit shift to the right is simply dropping the least significant bit (LSB) of each value and using the remaining eight most significant bits (MSB) of the 9-bit word as the 8-bit quotient. The result is an eight-byte portion of a final line of processed or transformed pixel values 40', 42', 44' . . . , 54' produced in parallel from respective eight-byte portions of two adjacent lines of an interlaced image field.

The present invention can be embodied as a computer implemented process or processes and/or apparatus for performing such computer-implemented process or processes, and can also be embodied in the form of a tangible storage medium containing a computer program or other machine-readable instructions (herein "computer program"), wherein when the computer program is loaded into a computer or other processor (herein "computer") and/or is executed by the computer, the computer becomes an apparatus for practicing the invention. Storage media for containing such computer program include, for example, floppy disks and diskettes, compact disks (CD)-ROMs (whether or not writeable), DVD digital disks, RAM and ROM memories, computer hard drives and back-up drives, and any other storage medium readable by a computer. The invention can also be embodied in the form of a computer program, for example, whether stored in a storage medium or transmitted over a transmission medium such as electrical conductors, fiber optics or other light conductors, or by electromagnetic radiation, wherein when the computer program is loaded into a computer and/or is executed by the computer, the computer becomes an apparatus for practicing the invention. The invention may be implemented on a general purpose microprocessor or on a digital processor specifically configured to practice the invention. When a general-purpose microprocessor is employed, the computer program code configures the circuitry of the microprocessor to create specific logic circuit arrangements.

Figure 6A:
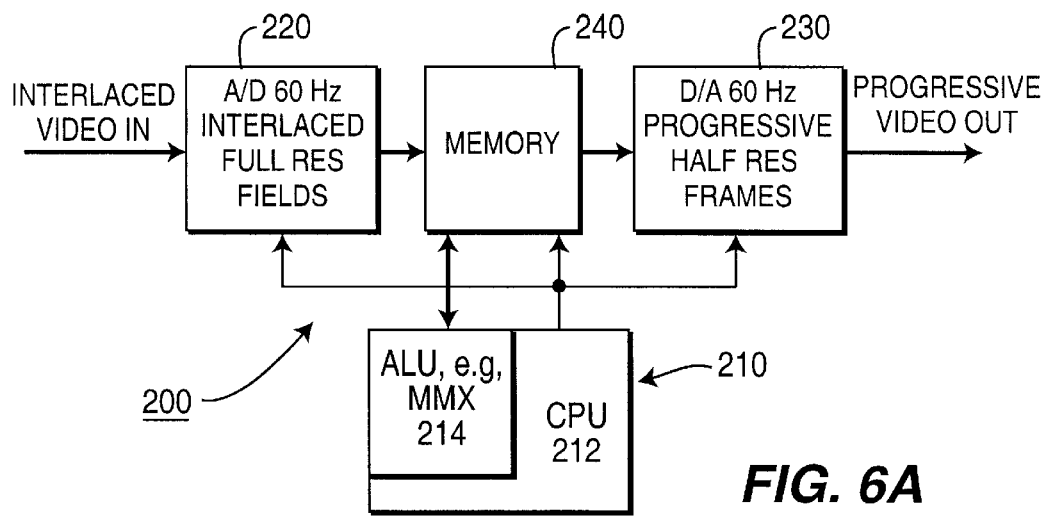
FIGS. 6A and 6B are block diagrams of an implementation of the present invention employing a computer.

FIG. 6A is a block diagram of an implementation of the present invention in an embodiment 200 employing a computer or processor 210. Incoming interlaced video signals at a 60 Hz field rate are applied to analog-to-digital (A/D) converter 220 which produces a sampled digital representation thereof including a sequence of digital words that are stored in addressable memory 240, all under the control of computer 210. Computer 210 includes central processing unit (CPU) 212 and arithmetic logic unit (ALU) 214, as is conventional, providing parallel processing of data. The narrow arrows of FIG. 6A represent signal paths for clock signals, control signals and memory addresses produced by CPU 212 of computer 210 to control, and the broad double-ended arrow represents a data bus for the digital data words produced by memory 240 that are provided to ALU 214 of computer 210 and the digital data words produced by ALU 214 that are provided to addressable memory 240 to be stored therein. Processed digital words representing selected pixel values are produced from memory address locations of addressable memory 240 that are called by CPU 212 and are applied to digital-to-analog (D/A) converter 230 which produces therefrom an analog progressive video signal output, all in accordance with the present invention.

Commercially available processors having cores including SIMD parallel processing capability include Intel Pentium® II and Pentium® III microprocessors and equivalent processors which execute the MMX instruction set, as well as the Motorola G4 Power PC types of microprocessors, and any other processor, but preferably one that includes digital signal processing engines for executing parallel processing operations in the background. In such processors, the de-interlacing processing according to the present invention can be performed under the control of software programs that configure the processor to perform the method of the present invention. In fact, because the operations of the present invention are much less computationally intensive that are the prior art de-interlacing schemes, de-interlacing according to the present invention may advantageously be performed as a background operation to the primary function of the processor, and so comes without any additional hardware, thereby avoiding any additional complexity and cost.

Figure 6B:
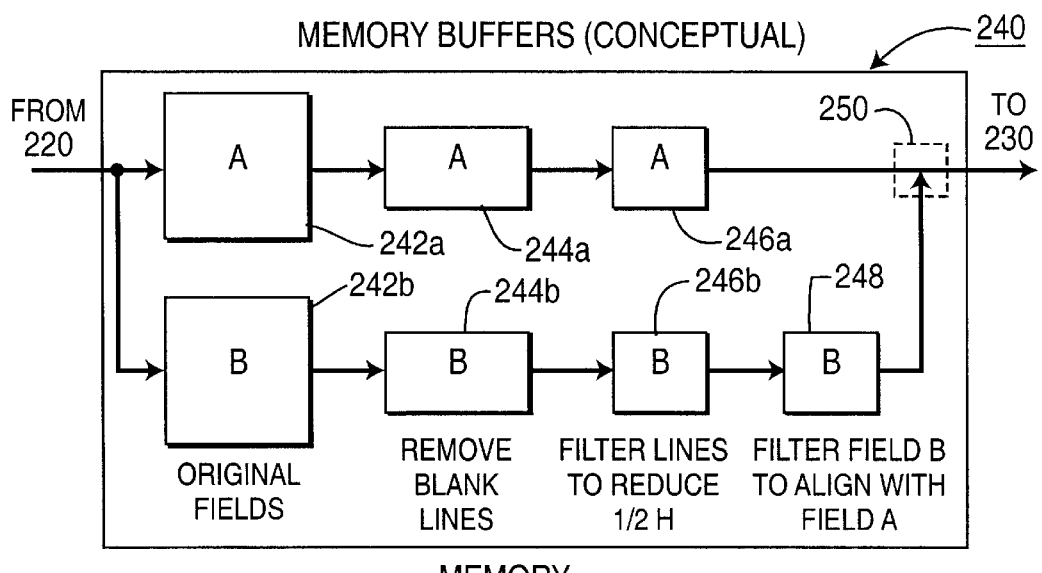

FIG. 6B is a conceptual block diagram of an implementation of the memory 240 of the computer embodiment 200 of FIG. 6A illustrating the processing of the digital video data. Digital words representing pixel values of interlaced video signals from A/D converter 220 are stored in field memory 242a if from interlaced field A and in field memory 242b if from interlaced field B. Field memories 242a, 242b are, for example, in an NTSC video system, each an addressable random access memory (RAM) having sufficient addressable memory locations for storing 480 horizontal lines of 720 8-bit pixels each. Since every other line of an interlaced field is blank, i.e. contains no pixel information, blank lines are ignored and pixel values from the non-blank lines are transferred to half-field memory 244a if from interlaced field A and to half-field memory 244b if from interlaced field B. Each half-field memory 244a, 244b is, for NTSC video, an addressable RAM having sufficient addressable memory locations for storing 240 horizontal lines of 720 8-bit pixels each.

Each line of video pixels stored in memories 244a, 244b is respectively filtered horizontally to produce a line of video data having one-half as many pixels and is stored in quarter-field memory 246a if from interlaced field A and in quarter-field memory 246b if from interlaced field B. Each quarter-field memory 246a, 246b is, for NTSC video, an addressable RAM having sufficient addressable memory locations for storing 240 horizontal lines of 360 8-bit pixels each. Further, to eliminate the ½-line vertical jitter described above, the lines from one of the fields is also filtered vertically. In FIG. 6B, adjacent lines from interlaced field B are retrieved from quarter-field memory 246b and are filtered vertically to produce a replacement line that is stored in quarter-field memory 248. Although the arrows representing data flow in FIG. 6B point directly from one memory to the next memory within memory 200, the digital pixel data produced by the one memory may in practice be transferred to ALU 214 where the horizontal or vertical filtering is performed and then be transferred back to be stored in the next memory within memory 200. Quarter-field memory 248 is, for NTSC video, an addressable RAM having sufficient addressable memory locations for storing 240 horizontal lines of 360 8-bit pixels each. Finally, processed filtered lines derived from interlaced fields A and B are alternately produced from memories 246a and 248 at combining node 250, which may be a simple connection if the outputs of memories 246a and 248 are of the so-called tri-state type, or may be a multiplexer if otherwise, to together provide a progressive video signal output. In NTSC video, for example, progressive video frames having 240 lines of 360 pixels each are produced at a 60-Hz frame rate.

It is noted that in a practical implementation of memory 200, a smaller amount of memory is utilized. For example, field memories 242a, 242b can be eliminated where computer 210 addresses and controls memory 200 to only store every other line of incoming digital video data from A/D converter 220, thereby removing the blank lines by simply not storing data from the pixel locations therein, and storing only the desired lines directly into half-field memories 244a, 244b. In addition, where horizontal filtering comprises eliminating every other pixel, half-field memories 244a, 244b may also be eliminated where computer 210 addresses and controls memory 200 to only store every other pixel of every other line of incoming digital video data from A/D converter 220, thereby removing the blank lines by simply not storing data from the pixel locations therein, and storing only every other pixel of the desired lines directly into quarter-field memories 246a, 246b. Thus, the function of memory 200 can be provided by only three quarter-field memories of 240 lines of 360 pixels each, i.e. a total of 720 lines of 360 8-bit pixels each, which is significantly less memory than is required for conventional de-interlacing arrangements. In fact, with more sophisticated memory control and addressing, the function of memories 246b and 248 can be provided by only two quarter-field memories plus several line memories, i.e. a total of only about 484 lines of 360 pixels each. Where more sophisticated filtering is employed, either in the vertical filtering, or both, additional memory and/or more sophisticated memory addressing and control is employed.

Figure 7:
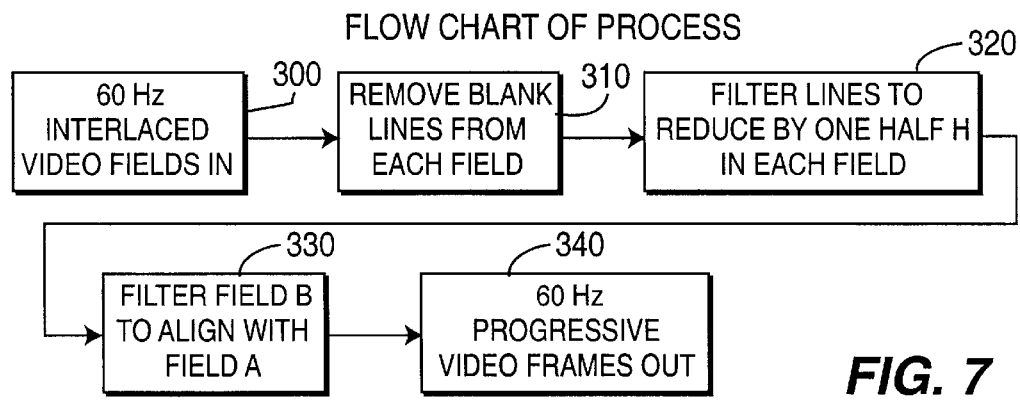
FIG. 7 is a flow chart diagram in accordance with the present invention.

FIG. 7 is a flow chart diagram illustrative of the method of the present invention. The method comprises receiving 300 interlaced video fields, whether in analog video or digitized video form, but preferably in digital video form, and removing 310 the blank lines from each interlaced video field. Removing 310 the blank lines may include simply dropping every other line, i.e. the blank lines, or may include filtering adjacent non-blank lines, wherein such filtering may include interpolating, averaging, dropping lines, and the like. Thus, interlaced fields of 480 lines each, in the NTSC format, are reduced to fields of 240 lines each. Filtering 320 the retained non-blank lines of each interlaced field to reduce by one half the number of pixels thereof in the horizontal direction may include simply dropping every other pixel, i.e. the even-numbered or the odd-numbered pixels, or may include filtering adjacent pixels, wherein such filtering may include interpolating, averaging, dropping alternate pixels, and the like. Preferably, the values of the pixel to be retained and of the immediately preceding and immediately following pixels are interpolated, for example, by averaging, to obtain the value of the retained pixel, thereby to tend to preserve detail to a greater extent than results from simply dropping every other pixel. Thus NTSC lines of 720 pixels each are reduced to lines of 360 pixels each. Filtering 330 of one interlaced field, e.g., field B, to align the lines thereof with the corresponding lines of the other field, e.g., field A, thereby to eliminate the ½-line vertical jitter caused by the alternating nature of the lines of the interlaced fields produces 340 progressive or non-interlaced video frames at a frame rate that is the same as the field rate of the received interlaced video. Preferably, filtering 330 includes interpolating the values of pixels in like positions along two adjacent nonblank lines of the one interlaced field to produce values of pixels in the same position along a line positioned between the two lines being interpolated, and in the same field. Also preferably, such interpolation includes averaging the values of the two pixels in corresponding positions along adjacent lines.

While the present invention has been described in terms of the foregoing exemplary embodiments, variations within the scope and spirit of the present invention as defined by the claims following will be apparent to those skilled in the art. For example, the removal of blank lines from each field could be performed in specific hardware configured to provide such function, as well as specific hardware configured to store two or more lines of pixel values, to remove one half the pixel values along each line, and to transform, such as by adding or averaging or otherwise filtering or interpolating, the pixel values of adjacent lines on alternate fields. Specifically, storing of pixel values and removal of alternate pixel values for each line could be simply accomplished by an eight-bit wide shift register receiving the 8-bit pixel values of a particular horizontal line at its data inputs, and being clocked to store input data words at one-half the rate at which such data words are applied to its inputs.

In addition, the operation of removing one-half the pixels in a line of pixels or in a sequence of digital words representing such line of pixels is accomplished by filtering or interpolating the values of nearby pixels, which terms are intended to be interchangeable and to also encompass operations such a dropping every other pixel, averaging the values of two or more adjacent or nearby pixels (such as a two-pixel average or a three-pixel average).

What is claimed is:

1. A method of converting a sequence of interlaced image fields into a sequence of non-interlaced image frames comprising:
    removing each blank line of each image field, thereby to retain each line of each image field originally alternating with the blank lines therein, each such retained line including a sequence of image pixels; and
    removing one-half the image pixels of the sequence of image pixels of each retained line of each image field, whereby a non-interlaced image field having reduced vertical and horizontal resolution is produced from each interlaced image field.

2. The method of claim 1 wherein said removing one-half the image pixels comprises removing every other image pixel of said sequence of image pixels.

3. The method of claim 1 wherein said removing one-half the image pixels comprises interpolating at least two adjacent image pixels of said sequence of image pixels.

4. The method of claim 1 wherein said retained lines include analog image information, and said removing one-half the image pixels includes sampling the value of the analog image information at regular intervals of time.

5. The method of claim 1 wherein said retained lines include digital image information in a sequence of digital words, and said removing one-half the image pixels includes removing every other one of the digital words in the sequence of digital words.

6. The method of claim 1 wherein said retained lines include digital image information in a sequence of digital words, and said removing one-half the image pixels includes interpolating at least two successive ones of the digital words in the sequence of digital words.

7. A method of converting a sequence of interlaced image fields into a sequence of non-interlaced image frames comprising:
    removing each blank line of each image field, thereby to retain each line of each image field originally alternating with the blank lines therein, each such retained line including a sequence of image pixels; and
    removing one-half the image pixels of the sequence of image pixels of each retained line of each image field,
    wherein said removing each blank line includes obtaining a line of pixel values from pixel values of two adjacent lines containing image pixels, retaining the obtained pixel values, and removing the two adjacent lines containing pixel values.

8. The method of claim 7 wherein said obtaining a line of pixel values includes interpolating pixel values from values of corresponding pixels of the two adjacent lines containing image pixels.

9. The method of claim 8 wherein said interpolating pixel values includes averaging the values of the corresponding pixels of the two adjacent lines containing pixel values.

10. The method of claim 7 wherein said obtaining a line of pixel values operates on alternate ones of the interlaced fields.

11. The method of claim 7 wherein said removing one-half the pixels precedes said obtaining a line of pixel values.

12. A method of converting an interlaced image including a sequence of first and second interlaced fields at a field rate into a progressive scan image including a sequence of progressive scan frames at a frame rate equivalent to the field rate, said method comprising:
    removing each blank line of each of the first and second fields and retaining each line of each of said first and second fields that originally alternates with the blank lines therein, each such retained line including a sequence of pixels,
    whereby a sequence of first and second frames having one-half the vertical resolution of the interlaced image is produced; and
    removing one-half the pixels of the sequence of pixels of each retained line of each of the first and second fields, whereby a sequence of first and second progressive scan frames having one-half the vertical resolution and one-half the horizontal resolution of the interlaced image is produced.

13. The method of claim 12 wherein said removing one-half the pixels comprises removing every other pixel of said sequence of pixels of each retained line of each of the first and second fields.

14. The method of claim 12 wherein said removing one-half the pixels comprises interpolating at least two adjacent pixels of said sequence of pixels of each retained line of each of the first and second fields.

15. The method of claim 12 wherein said retained lines of the first and second fields include analog pixel information, and said removing one-half the pixels includes sampling the value of the analog pixel information at regular intervals of time.

16. The method of claim 12 wherein said retained lines include a sequence of digital pixel values, and said removing one-half the pixels includes removing every other one of the digital pixel values in the sequence of digital pixel values.

17. The method of claim 12 wherein said retained lines include a sequence of digital pixel values, and said removing one-half the pixels includes interpolating at least two adjacent ones of the digital pixel values in the sequence of digital pixel values.

18. A method of converting an interlaced image including a sequence of first and second interlaced fields at a field rate into a progressive scan image including a sequence of progressive scan frames at a frame rate equivalent to the field rate, said method comprising:

removing each blank line of each of the first and second fields and retaining each line of each of said first and second fields that originally alternates with the blank lines therein, each such retained line including a sequence of pixels, wherein said removing each blank line includes with respect to one of the first and second fields, obtaining a line of pixel values from pixel values of two adjacent pixel-containing lines of the one of the first and second fields, retaining the obtained pixel values, and removing the two adjacent pixel-containing lines, whereby a sequence of first and second frames having one-half the vertical resolution of the interlaced image is produced; and removing one-half the pixels of the sequence of pixels of each retained line of each of the first and second fields, whereby a sequence of first and second progressive scan frames having one-half the vertical resolution and one-half the horizontal resolution of the interlaced image is produced.

19. The method of claim 18 wherein said obtaining a line of pixel values includes interpolating pixel values from values of corresponding pixels of the two adjacent pixel-containing lines of the one of the first and second fields.

20. The method of claim 19 wherein said interpolating pixel values includes averaging the values of the corresponding pixels of the two adjacent pixel-containing lines of the one of the first and second fields.

21. The method of claim 18 wherein said removing one-half the pixels of the sequence of pixels of the one of the first and second fields precedes said obtaining a line of pixel values from pixel values of two adjacent pixel-containing lines of the one of the first and second fields.

22. A storage medium encoded with machine-readable computer instructions for converting a sequence of interlaced image fields into a sequence of non-interlaced image frames comprising:

means for causing a computer to remove each blank line of each image field, thereby to retain each line of each image field originally alternating with the blank lines therein, each such retained line including a sequence of image pixels; and means for causing the computer to remove one-half the image pixels of the sequence of image pixels of each retained line of each image field, whereby a non-interlaced image field having reduced vertical and horizontal resolution is produced from each interlaced image field.

23. The storage medium of claim 22 wherein said retained lines include digital image information in a sequence of digital values, and said means for causing the computer to remove one-half the image pixels includes means for causing the computer to remove every other one of the digital values in the sequence of digital values.

24. A storage medium encoded with machine-readable computer instructions for converting a sequence of interlaced image fields into a sequence of non-interlaced image frames comprising:

means for causing a computer to remove each blank line of each image field, thereby to retain each line of each image field originally alternating with the blank lines therein, each such retained line including a sequence of image pixels; and means for causing the computer to remove one-half the image pixels of the sequence of image pixels of each retained line of each image field, wherein said means for causing the computer to remove each blank line includes: means for causing the computer to obtain a line of pixel values from pixel values of two adjacent lines containing image pixels, means for causing the computer to retain the obtained pixel values, and means for causing the computer to remove the two adjacent lines containing pixel values.

25. The storage medium of claim 24 wherein said means for causing the computer to obtain a line of pixel values includes means for causing the computer to interpolate pixel values from values of corresponding pixels of the two adjacent lines containing image pixels.

26. The storage medium of claim 25 wherein said means for causing the computer to interpolate pixel values includes means for causing the computer to average the values of the corresponding pixels of the two adjacent lines containing pixel values.

27. The storage medium of claim 24 wherein said means for causing the computer to obtain a line of pixel values operates on alternate ones of the interlaced fields.

28. The storage medium of claim 24 wherein said means for causing the computer to remove one-half the pixels removes one-half the pixels before said means for causing the computer to obtain a line of pixel values obtains the line of pixel values.

* * * * *